US008800871B2

(12) United States Patent
Yeh et al.

(10) Patent No.: US 8,800,871 B2
(45) Date of Patent: Aug. 12, 2014

(54) RFID READER/WRITER AND ASSEMBLY THEREOF

(71) Applicant: Microelectronics Technology, Inc., Hsinchu (TW)

(72) Inventors: Yao Cheng Yeh, Hsinchu (TW); Tung Yeh Chiang, Hsinchu (TW); Tsung Cheng Chen, Hsinchu (TW); Wei Hsuan Chen, Hsinchu (TW); Ming Tsang Chen, Hsinchu (TW); Chao Min Tsai, Hsinchu (TW); Chung Chieh Chao, Hsinchu (TW); Ya Chi Lee, Hsinchu (TW); Yen Ning Cheng, Hsinchu (TW); Ming Hsun Tu, Hsinchu (TW); Darryn Wayne Prince, Encinitas, CA (US)

(73) Assignee: Microelectronics Technology, Inc., Hsinchu (TW)

( * ) Notice: Subject to any disclaimer, the term of this patent is extended or adjusted under 35 U.S.C. 154(b) by 6 days.

(21) Appl. No.: 13/673,447

(22) Filed: Nov. 9, 2012

(65) Prior Publication Data
US 2013/0256412 A1 Oct. 3, 2013

Related U.S. Application Data

(60) Provisional application No. 61/618,247, filed on Mar. 30, 2012.

(51) Int. Cl.
| G06K 19/00 | (2006.01) |
| G06K 7/10 | (2006.01) |
| H01Q 1/22 | (2006.01) |
| H01Q 9/42 | (2006.01) |

(52) U.S. Cl.
CPC .......... *G06K 7/10316* (2013.01); *H01Q 1/2275* (2013.01); *H01Q 9/42* (2013.01); *G06K 7/10386* (2013.01)
USPC ............ 235/439; 235/435; 235/487; 235/492

(58) Field of Classification Search
USPC ............ 235/435, 439, 487, 492; 340/10, 572
See application file for complete search history.

(56) References Cited

U.S. PATENT DOCUMENTS

| 6,480,143 B1 | 11/2002 | Kruger et al. | |
| 2007/0046543 A1* | 3/2007 | Choi et al. ............. | 343/700 MS |
| 2008/0238622 A1* | 10/2008 | Rofougaran et al. ........ | 340/10.1 |

(Continued)

FOREIGN PATENT DOCUMENTS

CN 101789542 7/2010

OTHER PUBLICATIONS

Search Report dated Apr. 9, 2013 from the EP counterpart application 12193479.9 which cites US2009/0273445 and CN101789542.

(Continued)

*Primary Examiner* — Michael G Lee
*Assistant Examiner* — Matthew Mikels
(74) *Attorney, Agent, or Firm* — WPAT, P.C.; Anthony King

(57) ABSTRACT

A Radio Frequency Identification (RFID) assembly includes an RFID reader/writer having a first micro-USB (Universal-Serial-Bus) connector and a mobile phone having a second micro-USB connector configured to electrically connect to the first micro-USB connector. In one embodiment of the present disclosure, the RFID reader/writer includes a circuit board having a first processor and a first USB controller, and an antenna board stacked on the circuit board, wherein the first USB controller electrically connects the first processor and the first micro-USB connector, and the antenna board includes a reverse F-shaped antenna. In one embodiment of the present disclosure, the mobile phone includes a second processor, and a second USB controller electrically connecting the second processor and the second micro-USB connector.

22 Claims, 12 Drawing Sheets

(56) References Cited

U.S. PATENT DOCUMENTS

2009/0273445 A1\* 11/2009 Sher ............................ 340/10.1
2011/0279274 A1 11/2011 Im et al.

OTHER PUBLICATIONS

Please note that p. 4 of the EP Search Report provides the English translation for CN101789542.

\* cited by examiner

RFID READER/WRITER AND ASSEMBLY THEREOF

BACKGROUND

1. Technical Field

The present disclosure relates to an Radio Frequency Identification (RFID) reader/writer capable of connecting with a mobile phone and assembly thereof, and more particularly, to an RFID reader/writer capable of connecting with a mobile phone.

2. Description of Related Arts

Radio Frequency Identification (RFID) is an automatic identification method, relying on storage and remote retrieval of data using devices called RFID tags or transponders. Typically, an RFID system is composed of an RFID tag and an RFID identification apparatus. The RFID tag emits an identification signal automatically or generates it when receiving a signal from the RFID identification apparatus. The RFID identification apparatus receives the identification signal to identify the RFID tag.

Because of the convenience of the RFID technique, it is mainly applied to enterprise supply chain management, such as product tracking and inventory management, while transportation payments, passport, vehicle management, animal tags, human implants and library management are all fields to which the RFID technique may apply.

SUMMARY

One aspect of the present disclosure provides a Radio Frequency Identification (RFID) reader/writer capable of connecting with a mobile phone.

An RFID reader/writer according to this aspect of the present disclosure comprises a circuit board including a Universal-Serial-Bus (USB) controller; a micro-USB connector electrically connected to the USB controller; and an antenna board stacked on the circuit board, wherein the antenna board includes a reverse F-shaped antenna.

An RFID assembly according to another aspect of the present disclosure includes an RFID reader/writer having a first micro-USB connector and a mobile phone having a second micro-USB connector configured to electrically connect to the first micro-USB connector. In one embodiment of the present disclosure, the RFID reader/writer includes a circuit board having a first processor and a first USB controller, and an antenna board stacked on the circuit board, wherein the first USB controller electrically connects the first processor and the first micro-USB connector, and the antenna board includes a reverse F-shaped antenna. In one embodiment of the present disclosure, the mobile phone includes a second processor, and a second USB controller electrically connecting the second processor and the second micro-USB connector.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to an RFID reader/writer and assembly thereof. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
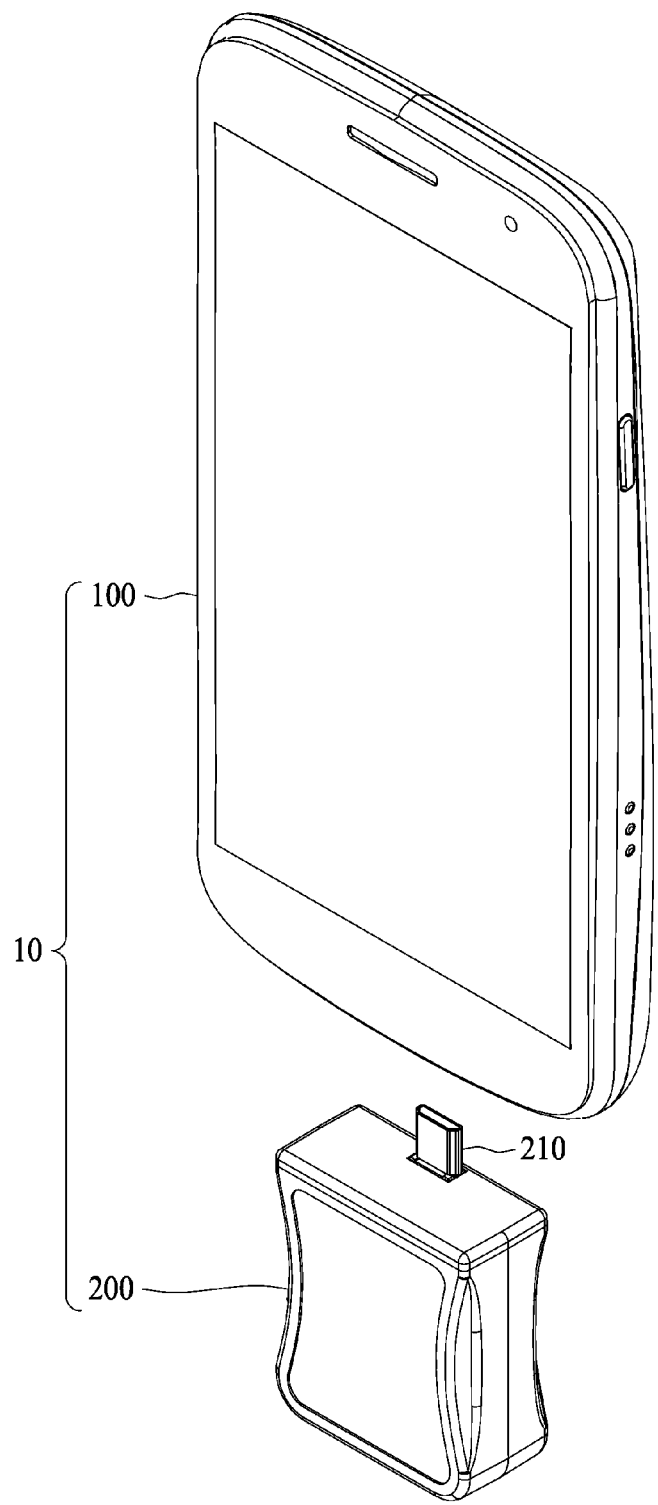
FIG. 1 and FIG. 2 illustrate a schematic view of a Radio Frequency Identification (RFID) assembly according to one embodiment of the present disclosure.
Figure 2:
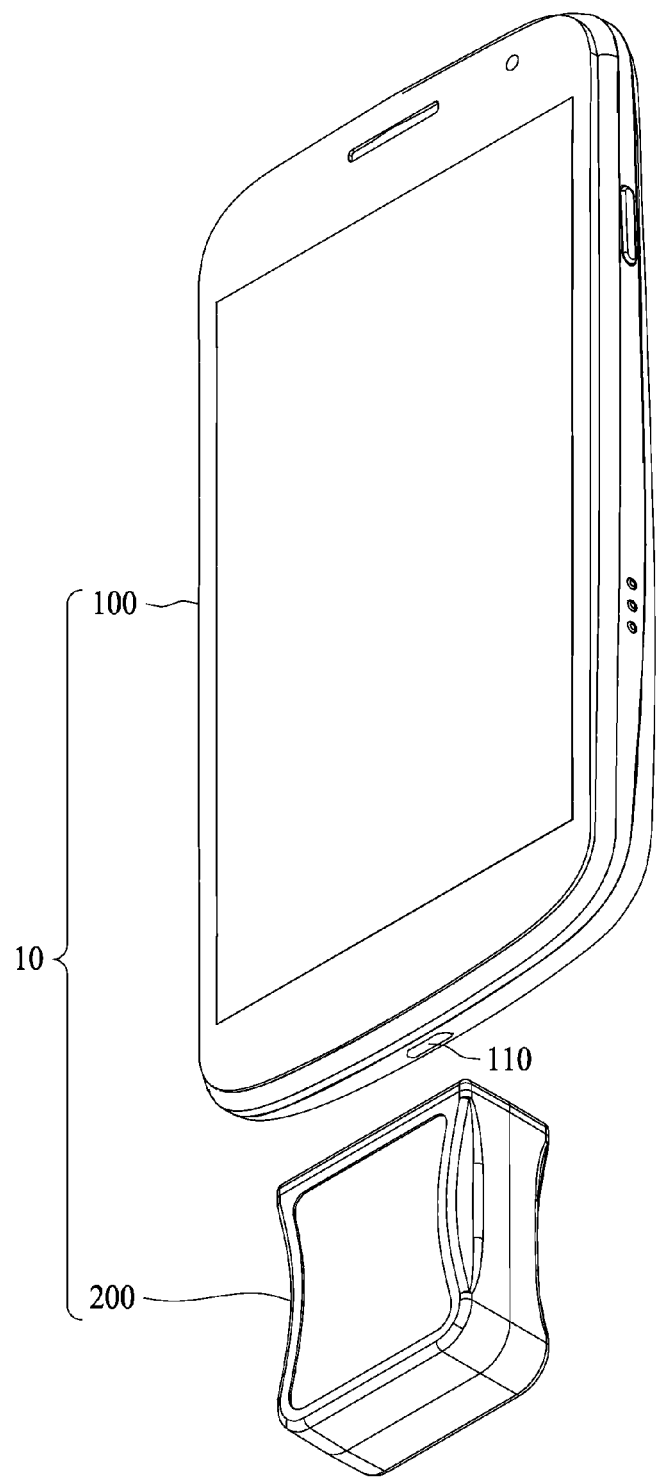

FIG. 1 and FIG. 2 illustrate a schematic view of a radio frequency identification (RFID) assembly 10 according to one embodiment of the present disclosure. In one embodiment of the present disclosure, the RFID assembly 10 includes an RFID reader/writer 200 having a first micro-USB connector 210 and a mobile phone 100 having a second micro-USB connector 110 configured to electrically connect to the first micro-USB connector 110. In one embodiment of the present disclosure, the size of the RFID reader/writer 200 is smaller than the size of the mobile phone 100.

Figure 3:
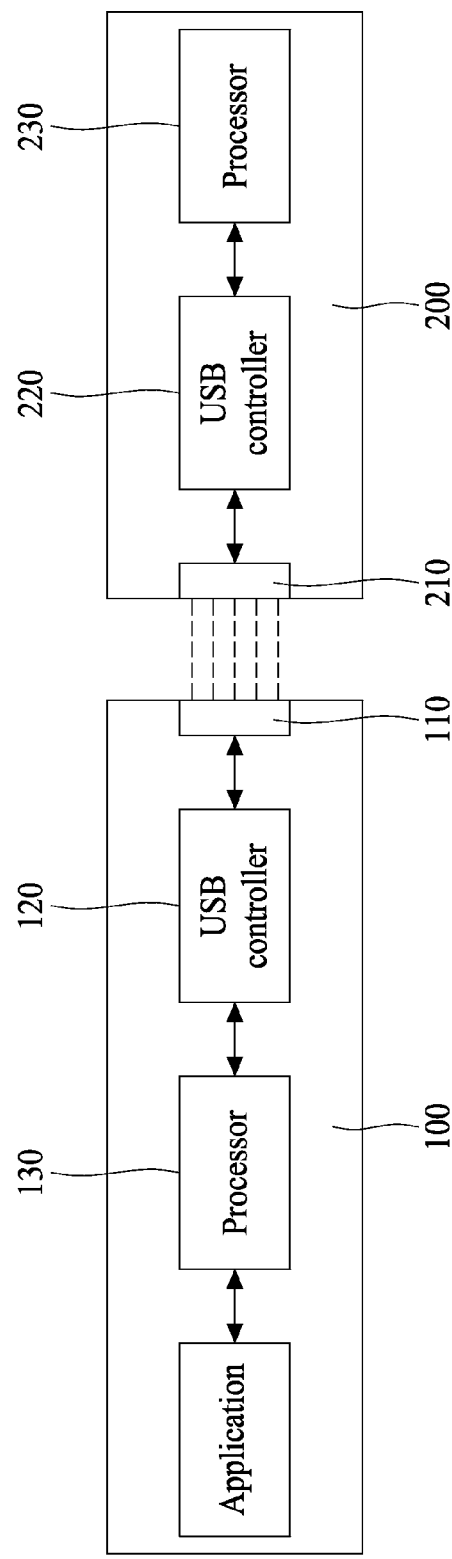
FIG. 3 illustrates a functional block diagram of the RFID assembly according to one embodiment of the present disclosure.

FIG. 3 illustrates a functional block diagram of the RFID assembly 10 according to one embodiment of the present disclosure. In one embodiment of the present disclosure, the RFID reader/writer 200 includes a first processor 230 and a first USB controller 220, which electrically connects the first processor 230 and the first micro-USB connector 210; the mobile phone 100 includes a second processor 130 and a second USB controller 120, which electrically connects the second processor 130 and the second micro-USB connector 110.

Figure 4:
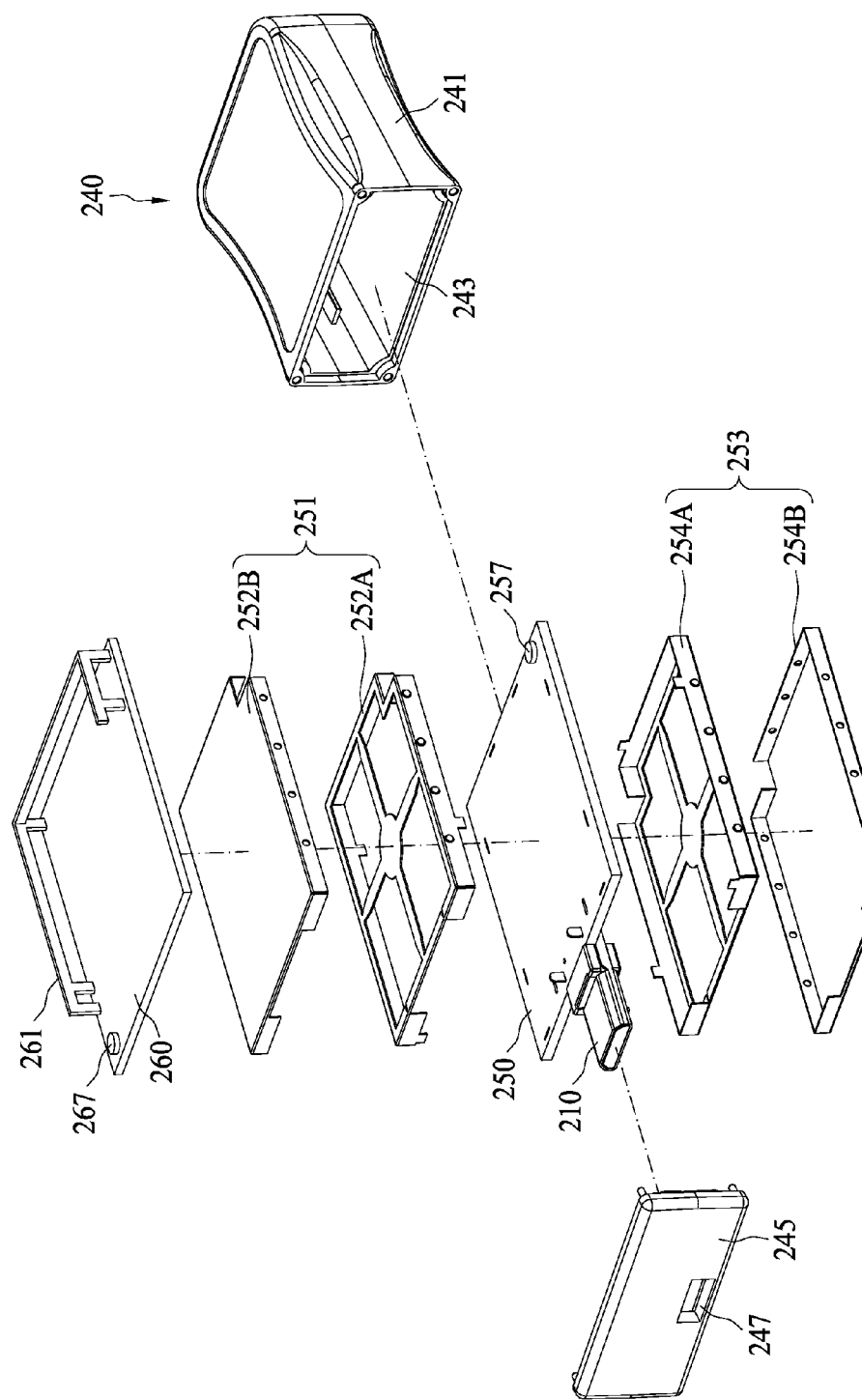
FIG. 4 illustrates a disassembled view of the RFID reader/writer according to one embodiment of the present disclosure.

FIG. 4 illustrates a disassembled view of the RFID reader/writer 200 according to one embodiment of the present disclosure. In one embodiment of the present disclosure, the RFID reader/writer 200 includes an insulating housing 240, a circuit board 250, a top metal shielding 251 positioned on a top surface of the circuit board 250, a bottom metal shielding 253 positioned on a bottom surface of the circuit board 250, and an antenna board 260 with a reverse F-shaped antenna 261 stacked on the top metal shielding 251. In one embodiment of the present disclosure, the circuit board 250 has an electrical connector 257, the antenna board 260 has an electrical connector 267, and a cable (not shown in the drawings) can connect the electrical connector 257 and the electrical connector 267 to form an electrical signal transmission channel between the circuit board 250 and antenna board 260.

In one embodiment of the present disclosure, the insulating housing 240 includes a body 241 having a front aperture 243 and a front cover 245 configured to seal the front aperture 243, in which the circuit board 250 and the antenna board 260 are positioned inside of the insulating housing 240. In one embodiment of the present disclosure, the front cover 245 has an opening 247, and the first micro-USB connector 210 extends out of the insulating housing 240 through the opening 247. In one embodiment of the present disclosure, the top metal shielding 251 includes a metal frame 252A and a metal cover 252B, and the bottom metal shielding 253 includes a metal frame 254A and a metal cover 254B.

Figure 5:
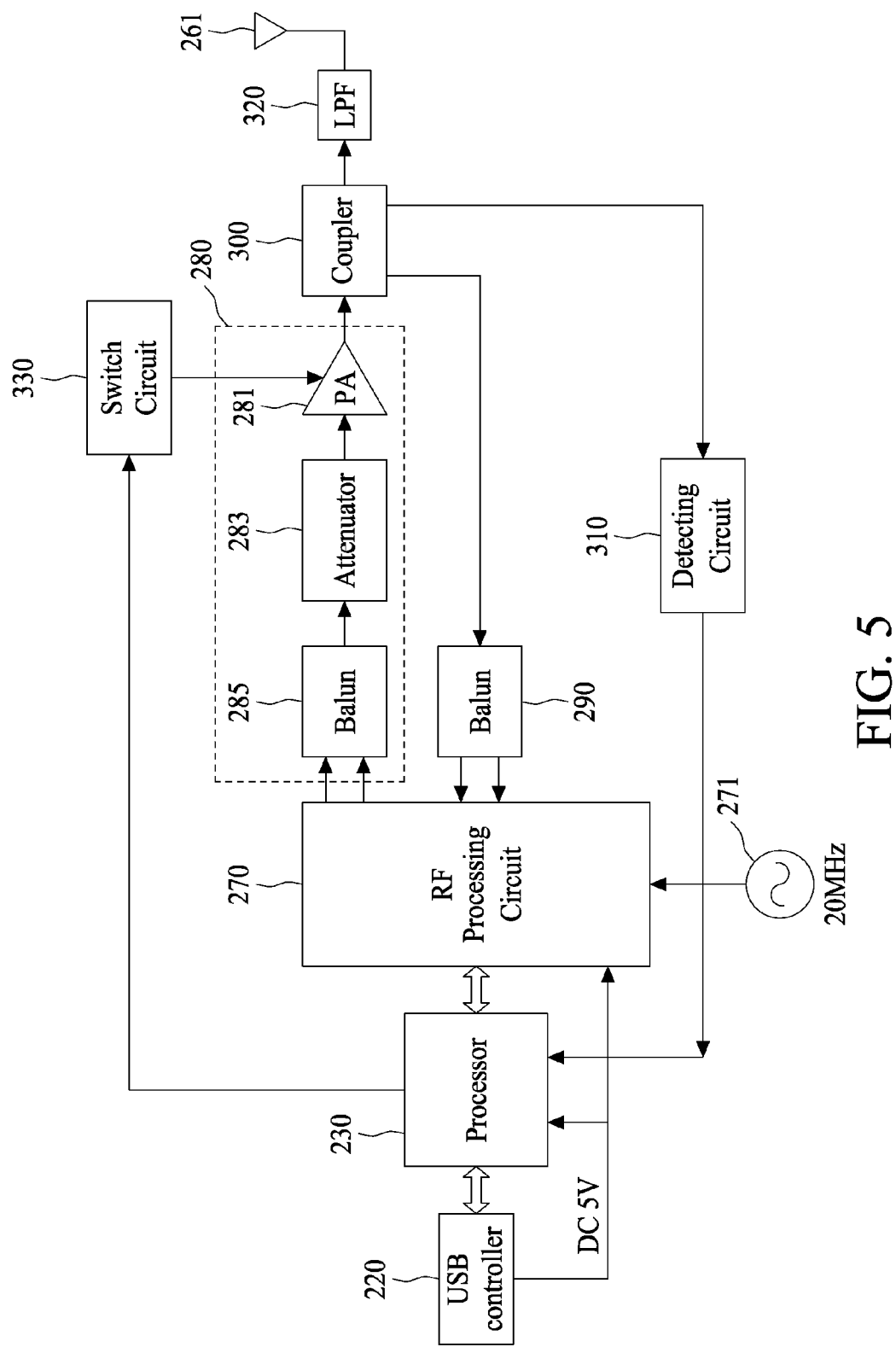
FIG. 5 illustrates a functional block diagram of the RFID reader/writer according to one embodiment of the present disclosure.
Figure 6A:
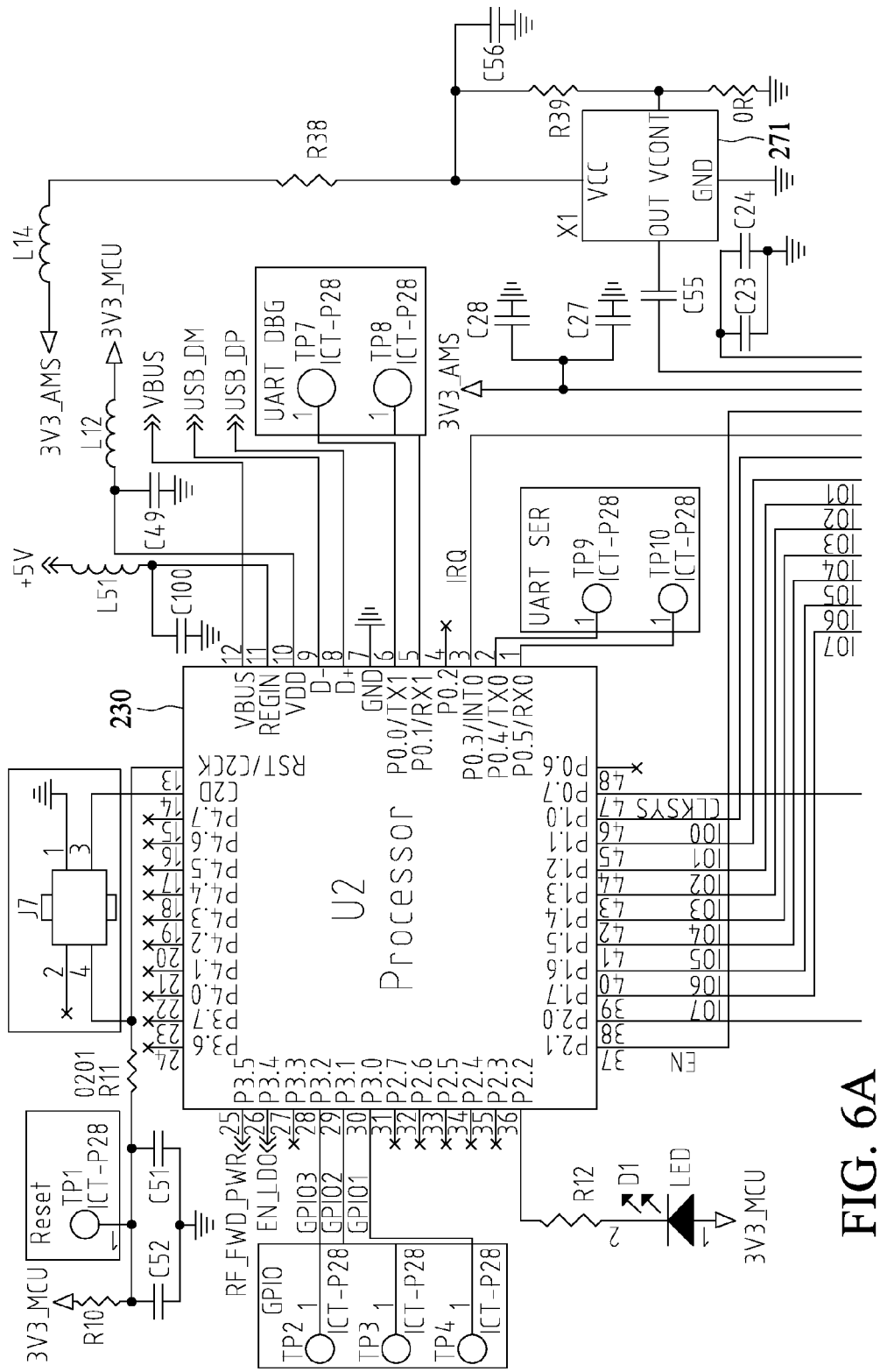
FIG. 6A, FIG. 6B and FIG. 7 illustrate a corresponding circuit diagram of the RFID reader/writer according to one embodiment of the present disclosure.
Figure 6B:
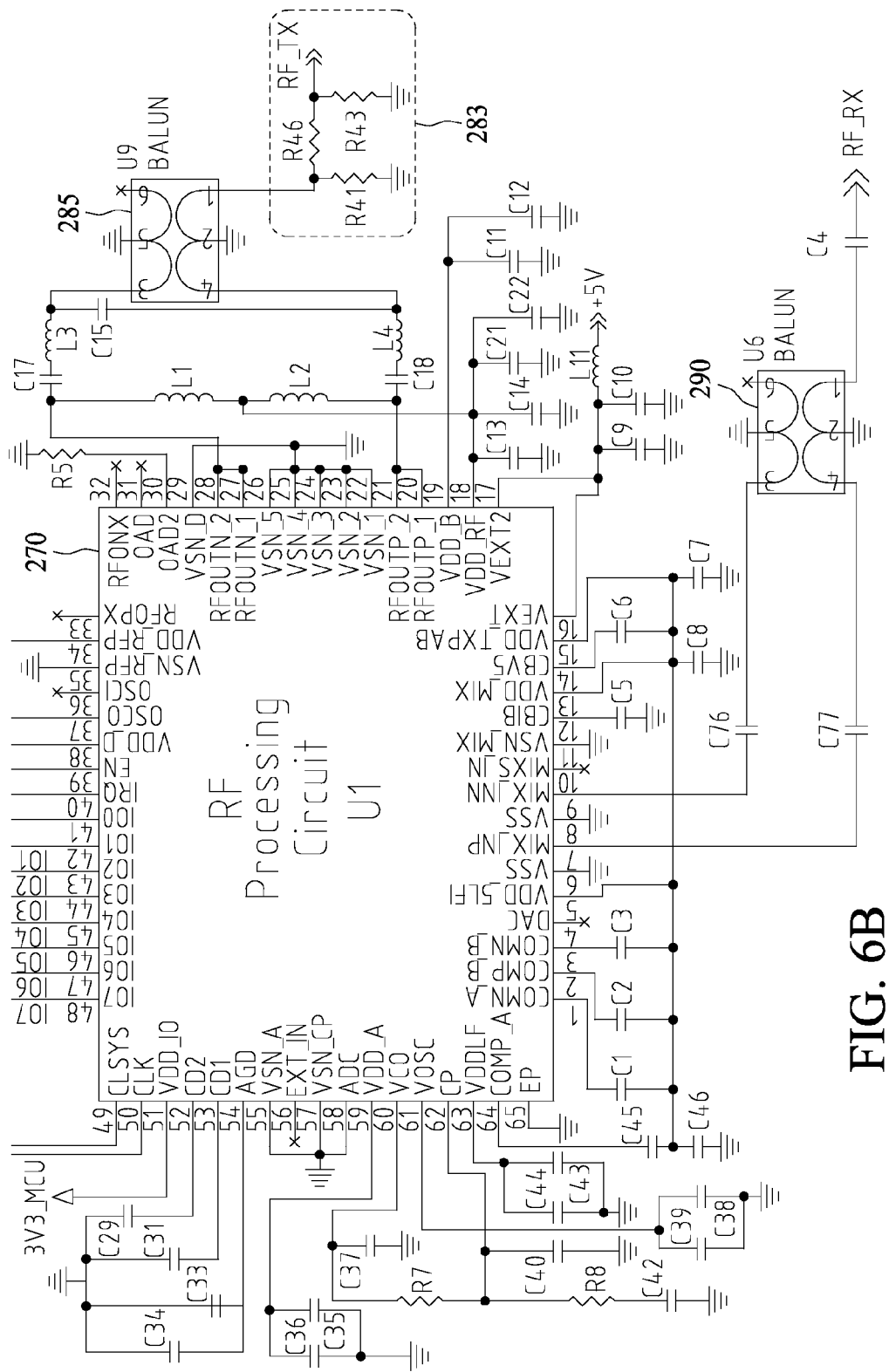
Figure 7:
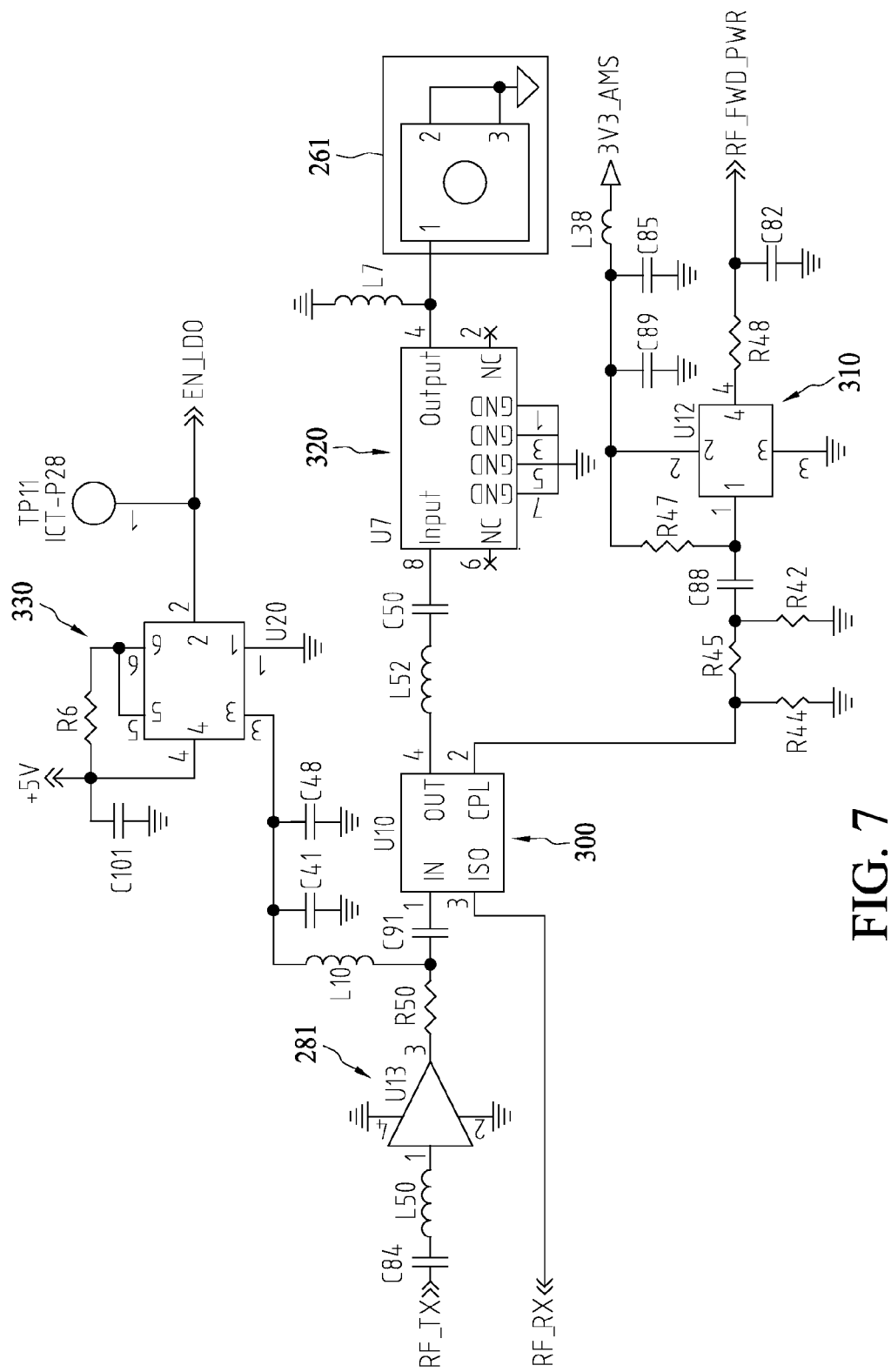

FIG. 5 illustrates a functional block diagram of the RFID reader/writer 200 according to one embodiment of the present disclosure, and FIG. 6A, FIG. 6B and FIG. 7 illustrate a corresponding circuit diagram of the RFID reader/writer 200 according to one embodiment of the present disclosure. In one embodiment of the present disclosure, the RFID reader/writer 200 includes the processor 230 that is electrically connected to the USB controller 220, an RF processing circuit 270 that is electrically connected to the processor 230, a transmission circuit 280 that is electrically connected to the RF processing circuit 270, a reception circuit 290 that is electrically connected to the RF processing circuit 270, an oscillator 271 that is electrically connected to the RF processing circuit 270, a coupler 300 that is electrically connected to the transmission circuit 280 and the reception circuit 290, a detection circuit 310 that is electrically connecting the coupler 300 and the processor 230, a low pass filter 320 that electrically connects the coupler 300 and the reverse F-shaped antenna 261, and a switch circuit 330 that electrically connects the processor 230 and a power amplifying circuit 281 of the transmission circuit 280. In one embodiment of the present disclosure, the transmission circuit 280 includes a balun 285 that is electrically connected to the RF processing circuit 270, and a attenuator 283 that electrically connects the balun 285 and the power amplifying circuit 281.

Figure 8:
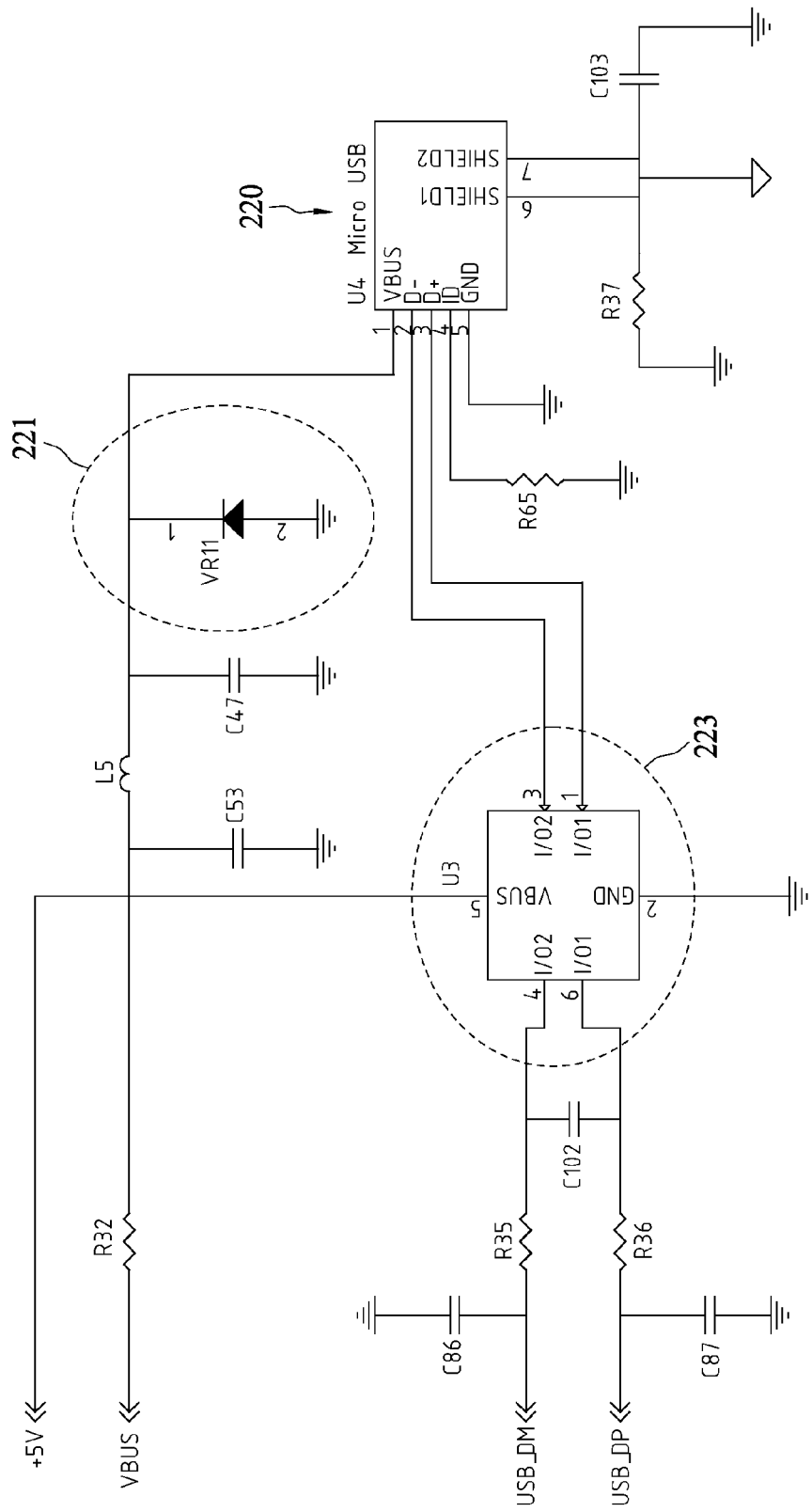
FIG. 8 illustrates a circuit diagram of the USB controller according to one embodiment of the present disclosure.

FIG. 8 illustrates a circuit diagram of the USB controller 220 according to one embodiment of the present disclosure. In one embodiment of the present disclosure, the USB controller 220 includes 7 pins. The pin number, the signal name, type and function of these pins are illustrated in the following table. In one embodiment of the present disclosure, the RFID reader/writer 200 includes a first protection circuit 221 that electrically connects a power terminal (VBUS) of the USB controller 220 and a power contact (VBUS) of the processor 230, and a second protection circuit 223 that electrically connects at least one signal terminal (D– and D+) of the USB controller and at least one data contact (D– and D+) of the processor 230.

| Signal Name | Pin Number | Type | Function Description |
| --- | --- | --- | --- |
| VBUS | 1 | Power | 5 V Voltage Regulator Power Supply Input |
| D– | 2 | Analog | USB Device Port Data– |
| D+ | 3 | Analog | USB Device Port Data+ |
| ID | 4 | Digital | OTG |
| GND | 5, 6, 7 | Ground | Ground |

Figure 9:
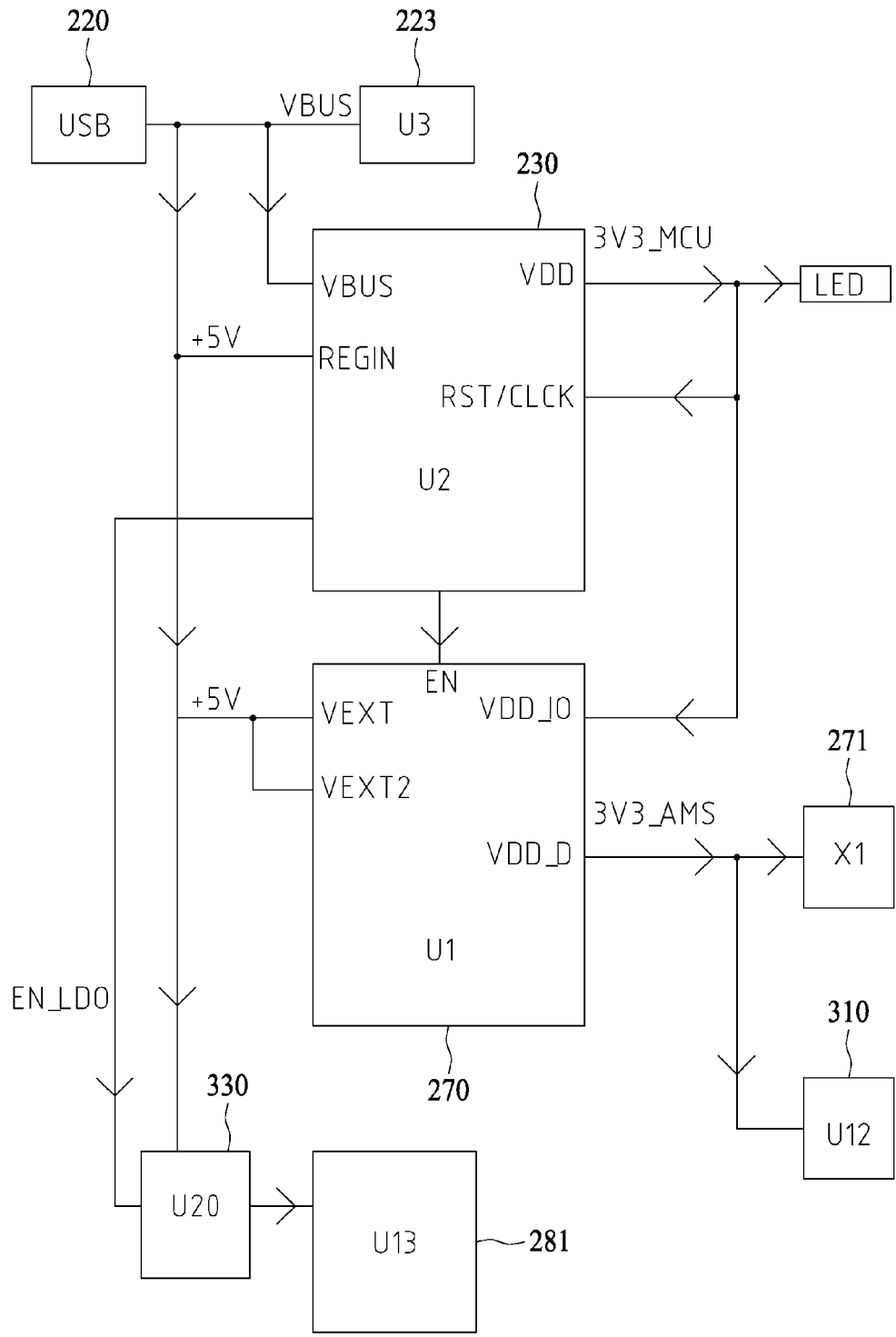
FIG. 9 illustrates a power distribution diagram of the RFID reader/writer according to one embodiment of the present disclosure.

FIG. 9 illustrates a power distribution diagram of the RFID reader/writer 200 according to one embodiment of the present disclosure. In one embodiment of the present disclosure, the first micro-USB connector 210 of the RFID reader/writer 200 is a micro-USB plug, and the second micro-USB connector 110 of the mobile phone 100 is a micro-USB receptacle. In one embodiment of the present disclosure, the mobile phone 100 is configured to provide operational power to the RFID reader/writer 200. In one embodiment of the present disclosure, the mobile phone 100 provides the operational power to the second micro-USB connector 110 as the first micro-USB connector 210 of the RFID reader/writer 200 is inserted into the second micro-USB connector 110 of the mobile phone 100. As shown in FIG. 9, the protection circuit 223, the first processor 230, the RF processing circuit 270, the oscillator 271, the power amplifying circuit 281, the detection circuit 310, and the switch circuit 330 all acquire the operational power from the first USB controller 220, which is electrically connected to the second micro-USB connector 110 of the mobile phone 110 via the first micro-USB connector 210.

Figure 10:
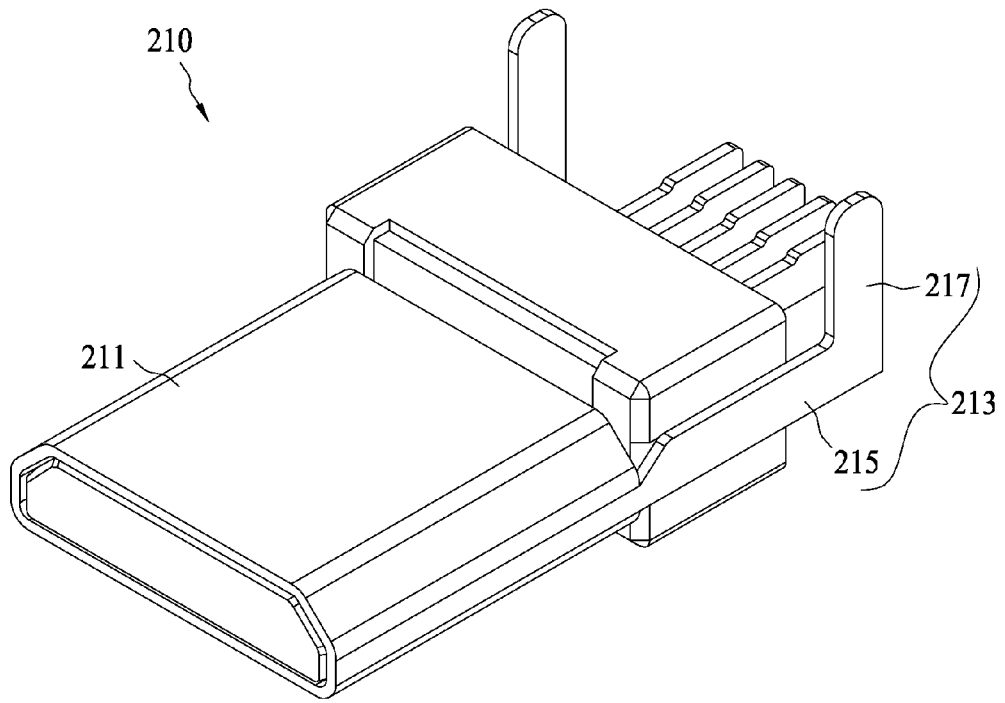
FIG. 10 illustrates a schematic view of the first micro-USB connector according to one embodiment of the present disclosure.
Figure 11:
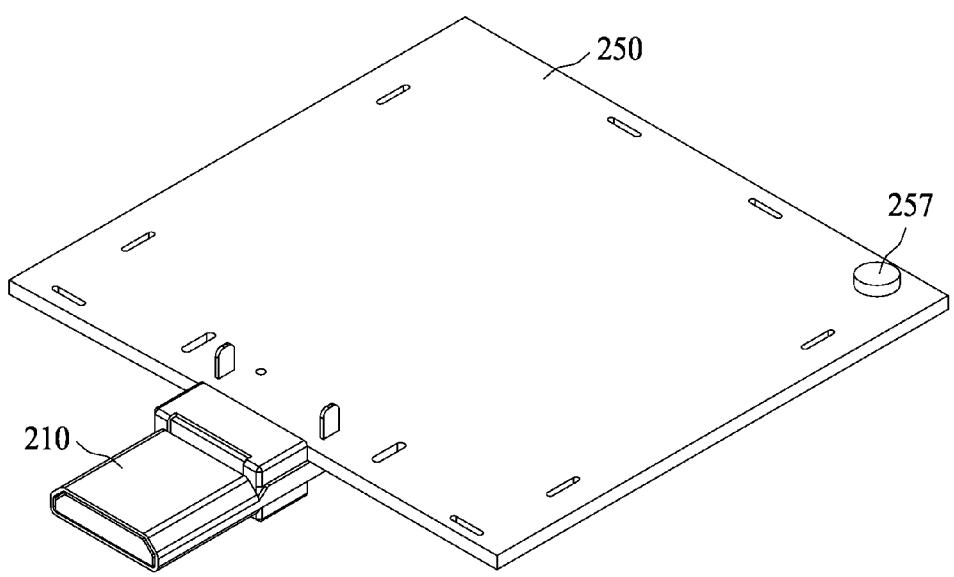
FIG. 11 illustrates a schematic view of the circuit board with the first micro-USB connector.

FIG. 10 illustrates a schematic view of the first micro-USB connector 210 according to one embodiment of the present disclosure, and FIG. 11 illustrates a schematic view of the circuit board 250 with the first micro-USB connector 210. In one embodiment of the present disclosure, the first micro-USB connector 210 includes a metal housing 211 having two soldering legs 213, in which the soldering legs 213 include a horizontal portion 215 and a vertical portion 217 connected to the horizontal portion 215. In one embodiment of the present disclosure, the circuit board 250 includes two though holes positioned at the peripheral, and the vertical portion 217 of the soldering legs 213 is positioned in the though holes and fixed to the circuit board 250 by soldering, such that the thickness of the assembly consisting of the circuit board and the first micro-USB connector 210 is minimized.

Figure 12:
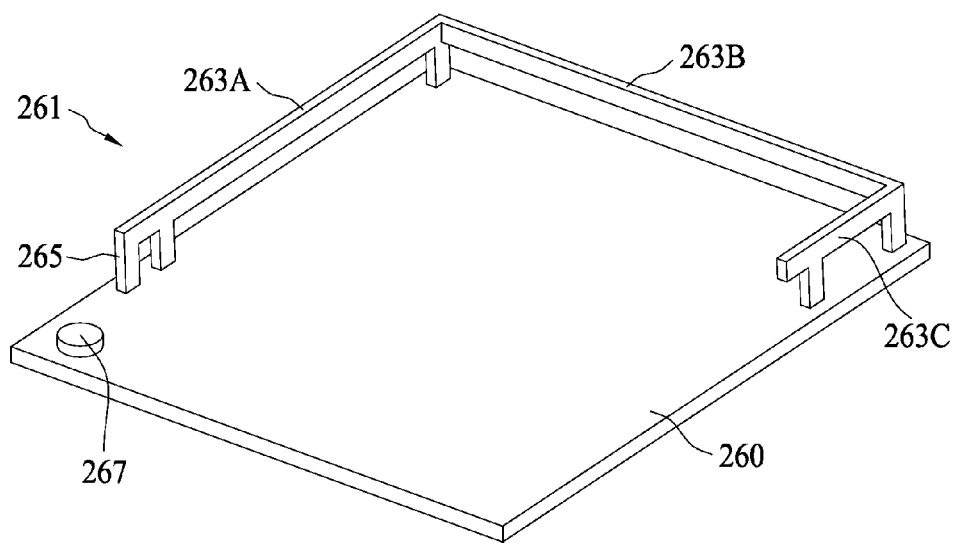
FIG. 12 illustrates a schematic view of the antenna board according to one embodiment of the present disclosure.

FIG. 12 illustrates a schematic view of the antenna board 260 according to one embodiment of the present disclosure. In one embodiment of the present disclosure, the reverse F-shaped antenna 261 includes a first horizontal segment 263A, a second horizontal segment 263B connected to the first horizontal segment 263A, substantially in a perpendicular manner, a third horizontal segment 263C connected to the second horizontal segment 263B, substantially in a perpendicular manner, and a plurality of vertical segments 265 connecting the base of the antenna board 260 with the first horizontal segment 263A, the second horizontal segment 263B and the third horizontal segment 263C. The reverse F-shaped antenna 261 has advantages such as small size, thin structure, wide frequency range, and no interference with metal.

The present disclosure directly integrates the micro-USB connector 210 such as the B-type plug on the circuit board 250 of a UHF RFID reader/writer 200 and implements an OTG function on the UHF RFID reader/writer 200 as well. Consequently, the UHF RFID reader/writer 200 can connect with the mobile device 100 directly. In one embodiment of the present disclosure, the UHF RFID Reader/writer integrates the processor 230 such as the micro controller (MCU), the RF processing circuit 270, and the RF front end circuit and the antenna 261. In one embodiment of the present disclosure, the RF front end circuit combines transmitting and receiving antennas (as known as mono-static technology), and the responding signal from the RFID tag is fed through the antenna 261, the coupler 300 and the balun of the reception circuit 290 to a demodulator of the RF processing circuit 270.

In one embodiment of the present disclosure, the processor 230 contains the RFID system firmware. The main function of the processor 230 is to control the RF processing circuit 270 and handle the RFID protocol. The processor 230 also controls the function of the other electronics, such as the power amplifying circuit 281, the switch circuit 330, the internal temperature sensors, and the analog to the digital converter. In addition, the processor 230 handles the USB communications between transmitting and receiving commands. In one embodiment of the present disclosure, the RF processing circuit 270 generates a carrier signal with a frequency between 860 and 960 MHz from the internal oscillator 271 such as a VCO. This carrier modulated with baseband signals for transmitting. The RF processing circuit 270 also handles RF demodulators and decoding data with RFID protocol.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A Radio Frequency Identification (RFID) reader/writer, comprising:
    a circuit board comprising a Universal-Serial-Bus (USB) controller;
    a micro-USB connector electrically connected to the USB controller;
    an antenna board stacked on the circuit board, wherein the antenna board includes a reverse F-shaped antenna; and
    an insulating housing with the circuit board and the antenna board positioned inside the insulating housing, and the micro-USB connector extending out of the insulating housing.

2. The RFID reader/writer of claim 1, wherein the circuit board further comprises:
    a processor electrically connected to the USB controller;
    an RF processing circuit electrically connected to the processor;
    a transmission circuit electrically connected to the RF processing circuit;
    a reception circuit electrically connected to the RF processing circuit; and
    a coupler electrically connected to the transmission circuit and the reception circuit.

3. The RFID reader/writer of claim 2, wherein the circuit board further comprises a detection circuit electrically connecting the coupler and the processor.

4. The RFID reader/writer of claim 2, wherein the circuit board further comprises a low pass filter electrically connecting the coupler and the reverse F-shaped antenna.

5. The RFID reader/writer of claim 2, wherein the circuit board further comprises a switch circuit electrically connecting the processor and a power amplifying circuit of the transmission circuit.

6. The RFID reader/writer of claim 2, wherein the circuit board further comprises:
    a first protection circuit electrically connecting a power terminal of the USB controller and a power contact of the processor; and
    a second protection circuit electrically connecting a signal terminal of the USB controller and a data contact of the processor.

7. The RFID reader/writer of claim 1, wherein the micro-USB connector includes a metal housing having two soldering legs, and at least one of the soldering legs includes a horizontal portion and a vertical portion connected to the horizontal portion.

8. The RFID reader/writer of claim 1, wherein the reverse F-shaped antenna includes a first horizontal segment, a second horizontal segment connected to the first horizontal segment substantially in a perpendicular manner, and a third horizontal segment connected to the second horizontal segment substantially in a perpendicular manner.

9. The RFID reader/writer of claim 1, further comprising a top metal shielding positioned on a top surface of the circuit board, and a bottom metal shielding positioned on a bottom surface of the circuit board.

10. A Radio Frequency Identification (RFID) assembly, comprising an RFID reader/writer having a first micro-USB (Universal-Serial-Bus) connector and a mobile phone having a second micro-USB connector configured to electrically connect to the first micro-USB connector;
    wherein the RFID reader/writer comprises:
        a circuit board including a first processor and a first USB controller electrically connecting the first processor and the first micro-USB connector; and an antenna board stacked on the circuit board, wherein the antenna board includes a reverse F-shaped antenna;

wherein the mobile phone comprises:

a second processor; and a second USB controller electrically connecting the second processor and the second micro-USB connector.

11. The RFID assembly of claim 10, wherein the circuit board further comprises:

an RF processing circuit electrically connected to the first processor;

a transmission circuit electrically connected to the RF processing circuit;

a reception circuit electrically connected to the RF processing circuit; and a coupler electrically connected to the transmission circuit and the reception circuit.

12. The RFID assembly of claim 11, wherein the circuit board further comprises a detection circuit electrically connecting the coupler and the first processor.

13. The RFID assembly of claim 11, wherein the circuit board further comprises a low pass filter electrically connecting the coupler and the reverse F-shaped antenna.

14. The RFID assembly of claim 11, wherein the circuit board further comprises a switch circuit electrically connecting the first processor and a power amplifying circuit of the transmission circuit.

15. The RFID assembly of claim 11, wherein the circuit board further comprises:

a first protection circuit electrically connecting a power terminal of the first USB controller and a power contact of the first processor; and a second protection circuit electrically connecting a signal terminal of the first USB controller and a data contact of the first processor.

16. The RFID assembly of claim 10, wherein the first micro-USB connector includes a metal housing having two soldering legs, and at least one of the soldering legs includes a horizontal portion, and a vertical portion connected to the horizontal portion.

17. The RFID assembly of claim 10, wherein the reverse F-shaped antenna includes a first horizontal segment, a second horizontal segment connected to the first horizontal segment substantially in a perpendicular manner, and a third horizontal segment connected to the second horizontal segment substantially in a perpendicular manner.

18. The RFID assembly of claim 10, further comprising a top metal shielding positioned on a top surface of the circuit board, and a bottom metal shielding positioned on a bottom surface of the circuit board.

19. The RFID assembly of claim 10, further comprising an insulating housing with the circuit board and the antenna board positioned inside the insulating housing, and the first micro-USB connector extending out of the insulating housing.

20. The RFID assembly of claim 10, wherein the mobile phone is configured to provide an operational power to the RFID reader/writer.

21. The RFID assembly of claim 10, wherein the first micro-USB connector is a micro-USB plug, and the second micro-USB connector is a micro-USB receptacle.

22. The RFID assembly of claim 10, wherein the size of the RFID reader/writer is smaller than the size of the mobile phone.

* * * * *